Sept. 17, 1935. M. P. BROWNE 2,014,553
SLIDING SEAT MOUNTING FOR VEHICLES
Filed July 18, 1932 2 Sheets-Sheet 1
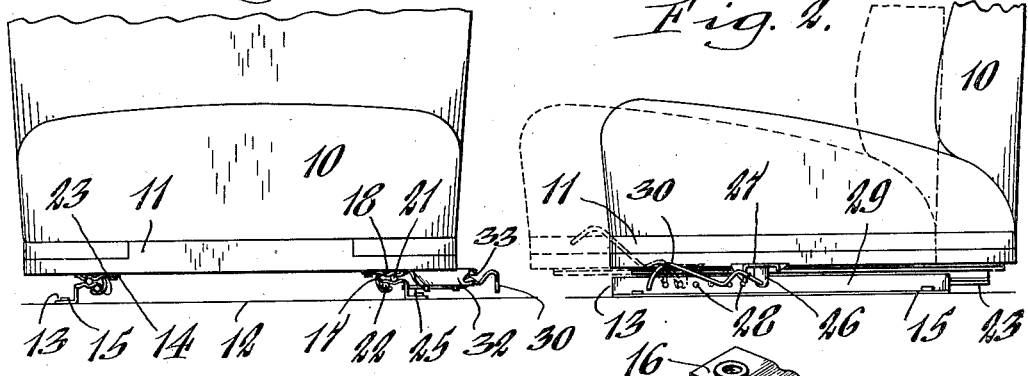
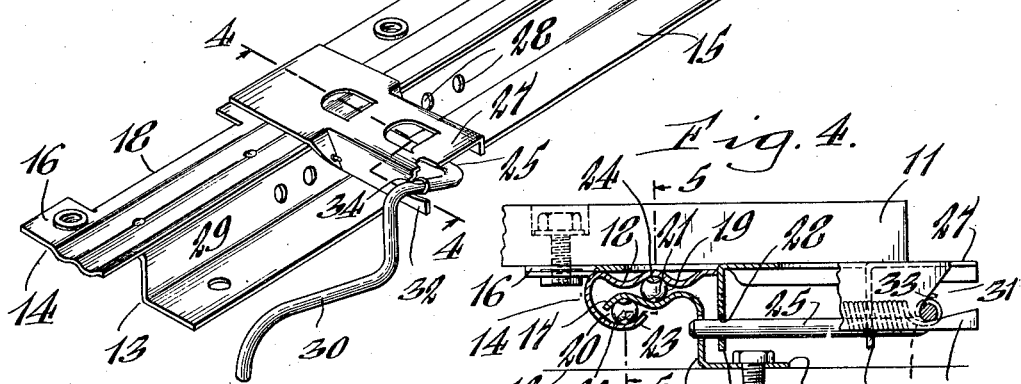
Inventor,
Montague P. Browne,
by Walter P. Geyer
Attorney.

Sept. 17, 1935.   M. P. BROWNE   2,014,553
SLIDING SEAT MOUNTING FOR VEHICLES
Filed July 18, 1932   2 Sheets-Sheet 2
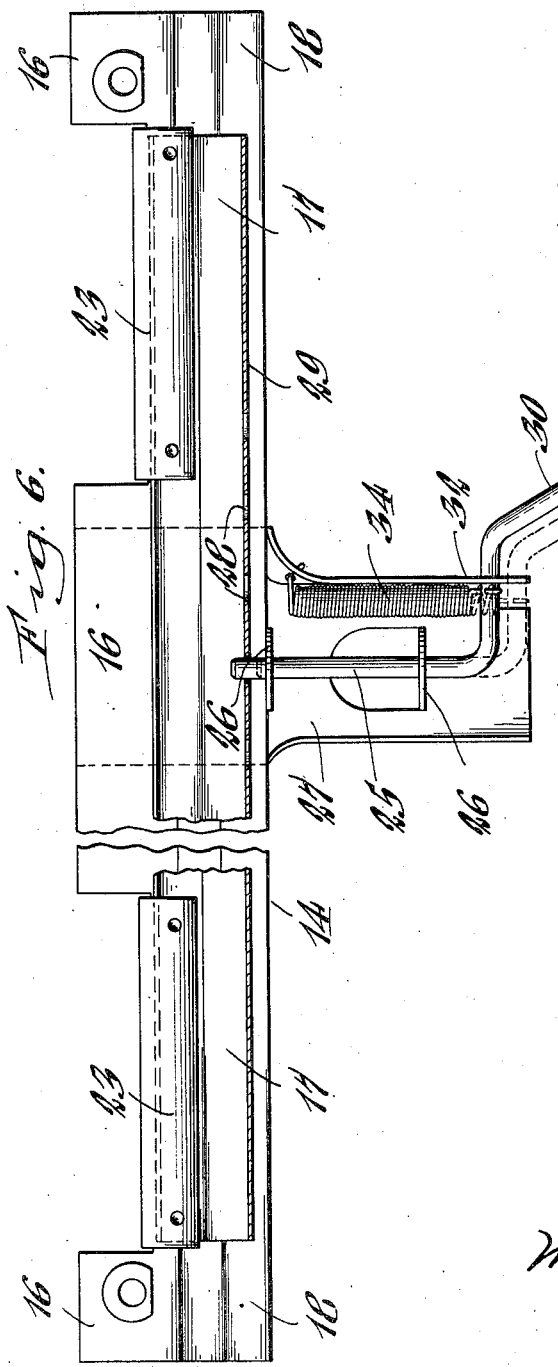
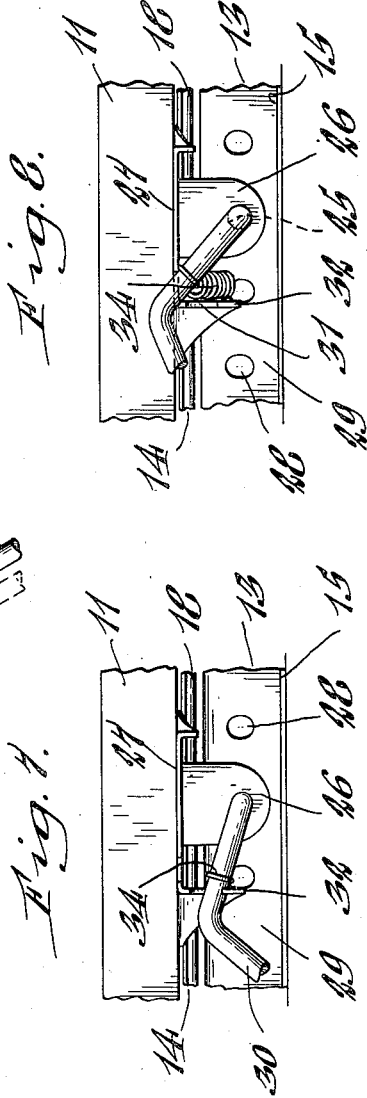

UNITED STATES PATENT OFFICE 2,014,553

SLIDING SEAT MOUNTING FOR VEHICLES

Montague P. Browne, Buffalo, N. Y., assignor to Mechanical Devices Corporation of America, Buffalo, N. Y., a corporation of New York Application July 18, 1932, Serial No. 623,038

10 Claims. (Cl. 155—14)

This invention relates to certain new and useful improvements in the mountings of sliding or adjustable seats such as are employed in automobiles.

One of its chief objects is the provision of a sliding seat mounting which is so designed and constructed as to reduce the seat-friction to a minimum, to afford maximum ease of operation, and at the same time provide a mounting which prevents movement in directions other than the fore and aft movement of the seat as well as play or rattle in all directions, thereby assuring, as a whole, a firm and tight seat mounting.

Another object of the invention is to provide a ball or roller mounting for sliding seats in combination with simple and effective means for limiting the vertical thrust of the seat.

A still further object is to provide a simple and inexpensive latch mechanism for releasably holding the seat in an adjusted position.

In the accompanying drawings:—Figure 1 is a front end view of a vehicle seat equipped with my improved mounting. Figure 2 is a side elevation thereof. Figure 3 is a detached perspective view of the latch-bearing slide plates or elements. Figure 4 is an enlarged cross section taken in the plane of line 4—4, Figure 3. Figure 5 is an enlarged fragmentary longitudinal section taken substantially in the plane of line 5—5, Figure 4. Figure 6 is an enlarged fragmentary bottom plan view, partly in section, of the latch-bearing slide plates. Figure 7 is a fragmentary side view showing the latch control lever and associated parts, the same being in its latched position. Figure 8 is a view similar to Figure 7 but showing the control lever in its unlatched position.

Similar characters of reference indicate corresponding parts throughout the several views.

By way of example, the invention is shown in connection with a longitudinally adjustable automobile seat 10, the base frame 11 thereof and floor 12 of the vehicle having complementary sliding or seat-guiding means which serve to support the seat at its opposite sides and guide it longitudinally when shifting the same to a desired set position.

In the preferred construction of the sliding seat mounting, the same consists of two sets of complementary guide members, plates or rails, indicated generally by the numerals 13 and 14, disposed adjacent the opposite side edges of the seat and secured, respectively, to the floor and underside of the seat-frame, as seen in Figures 1 and 4. Each of the floor-engaging plates 13 is substantially Z-shaped in cross section and has an attaching flange 15 for bolting or otherwise securing it to the floor, while the seat-plates 14 have attaching flanges 16 for securing them to the seat-frame 11. Each pair of complementary plates 13 and 14 have overlying slide or guide portions 17 and 18, respectively, which are preferably longitudinally corrugated with the troughs thereof oppositely disposed, as shown in Figure 4, to provide companion longitudinal race-ways 19 and 20 disposed in different vertical planes and adapted to receive anti-friction elements, such as ball bearings 21 and 22, respectively, therebetween to permit a free gliding action of the seat relative to the floor. The inner or lower race-way 20 is preferably formed between the inner corrugation of the slide portion 17 and an oppositely curved extension 23 depending downwardly and outwardly from the inner edge of the companion slide portion 18 and disposed in spaced, hook-like fashion about and beneath the marginal edge of said slide portion 17, as clearly seen in Figure 4. It will be noted that the balls bear at their top and bottom faces on the opposing race-way corrugations and sustain the latter in spaced relation free from contact with each other.

By this construction and arrangement of parts, the seat is not only guided in a true linear path with the utmost ease of operation and with the friction factor reduced to a minimum, but the up and down thrust of the seat is effectually absorbed by the overlying corrugated slide portions 17, 18 and floating balls 21, 22, which companion parts also resist lateral displacement of the seat relative to the floor.

For the purpose of limiting the fore and aft movement of the seat, the slide portions 17, 18 of the guide rails 13 and 14, respectively, may be provided with stop lugs or teats 24 which project into the race-ways 19, 20 and against which the balls 21 and 22 are adapted to abut, the teats being longitudinally spaced in accordance with the desired amount of seat-travel.

Means are provided for latching the seat at the will of the seat-occupant in any desired adjusted position, such means being associated with the guide rails 13, 14 and disposed for convenient manipulation by the occupant of the seat. In its preferred construction, this latching means consists of a combined rotary and axially movable latch bar or bolt 25 disposed transversely of the seat and supported in flanges 26 depending from a substantially horizontal plate or bracket 27 projecting outwardly from one of the seat-bearing rails 14, say the one at the left hand side of the seat. This bar is adapted to interlock with one or another of a series of openings 28 arranged in the web portion 29 of the floor-engaging rail 13 for latching the seat in a set adjusted position. The insertion and withdrawal of the latch bar to and from the openings 28 is preferably effected by a turning of the bar, and to this end the latter has an operating crank 30 at its outer end which may face forwardly as shown in Figures 2 and 3, and which is arched adjacent its front end to present a convenient grip to the seat-occupant, the free end of the arched portion terminating adjacent the floor and acting as a stop for limiting any accidental movement of the handle beyond a predetermined position. The inner portion of the crank-handle 30 is adapted to engage an outwardly-opening notch or recess 31 formed in a depending flange 32 of the bracket 27, said notch having an inclined or cam-like edge 33 against which the crank bears, so that when the latter is swung upwardly such cam-like edge forces the latch bar outwardly, withdrawing it from its opening 28 and releasing the seat for longitudinal adjustment. A spring 34 may be provided for constantly urging the latch bar to its latched position and for maintaining its crank in bearing engagement with the cam-like edge 33. Upon releasing the crank handle, while in its upward retracted position, shown by dotted lines in Figure 6 and by full lines in Figure 8, the spring 34 automatically moves the bar to the latched position shown by full lines in Figures 4, 6 and 7.

In practice, the attaching flange 15 of each floor-engaging rail 13 is pitched upwardly relatively to its corrugated slide portion 17, so that when the rail is bolted to the floor it will have a tendency to create a firm grip between the companion slide portion 17, 18 and the ball bearings 21, 22.

I claim as my invention:—

1. A sliding seat mounting for automobiles and the like, comprising a member adapted for attachment to the floor of the vehicle, a second member adapted for attachment to the vehicle seat, companion overlying slide portions on said members and having race-ways therein disposed in adjoining relation in different horizontal and vertical planes, and anti-friction elements arranged in the race-ways to slide freely lengthwise thereof, said slide portions in conjunction with said anti-friction elements resisting relative displacement of the seat in directions other than its direction of sliding movement.

2. A sliding seat mounting for automobiles and the like, comprising a member adapted for attachment to the floor of the vehicle, a second member adapted for attachment to the vehicle-seat, companion overlying slide portions on said members and having longitudinal corrugations therein forming opposing race-ways disposed in adjoining relation in different horizontal and vertical planes, and bearing elements arranged in said race-ways.

3. A sliding seat mounting for automobiles and the like, comprising a member adapted for attachment to the floor of the vehicle, a second member adapted for attachment to the vehicle-seat, companion, substantially horizontally disposed portions on said members in spaced overlying relation and having opposing longitudinal race-ways therebetween, one of said horizontal portions having a hook-like extension projecting around and below the plane of the marginal edge of the companion portion and disposed in underlying spaced relation thereto, said portions and said extension having opposing complementary race-ways therein disposed in different horizontal and vertical planes, and anti-friction elements arranged between said companion portions and said extension and engaging the race-ways thereof.

4. A sliding seat mounting for automobiles and the like, comprising a floor-engaging member having a horizontal slide portion containing longitudinal corrugations in its top and bottom sides forming race-ways, a seat engaging member having a slide portion overlying the first named slide portion and having an extension underlying the latter, said overlying and underlying slide portions having corrugations therein forming race-ways complementary to and in opposing relation to those in the first-named slide portion, and anti-friction elements arranged in said complementary race-ways.

5. A sliding seat mounting for automobiles and the like, comprising a member adapted for attachment to the floor of the vehicle, a second member adapted for attachment to the vehicle seat, companion slide portions on said members in superposed, substantially horizontal relation and including an intermediate single-walled, portion having guide channels disposed side by side in its top and bottom faces and facing upwardly and downwardly, respectively, and the overlying top and bottom portions having guide channels complementary to those of the intermediate portion, and anti-friction elements arranged between the complementary guide channels of said slide portions.

6. A sliding seat mounting for automobiles and the like, comprising a member adapted for attachment to the floor of the vehicle and having a horizontal slide portion having non-alined, oppositely-facing race-ways in its top and bottom sides, a second member adapted for attachment to the vehicle-seat and having a slide portion in overlying relation and a portion in underlying relation to the slide portion of the first-named member, each portion containing a race-way in line with and complementary to one of the race-ways of said first-named slide portion, whereby said complementary race-ways are disposed in different vertical and horizontal planes, and anti-friction bearing elements arranged in said race-ways.

7. A sliding seat mounting for automobiles and the like, comprising a floor-engaging member having a horizontal slide portion containing longitudinal corrugations forming upwardly and downwardly facing race-ways in the concave portions, thereof, a seat-engaging member having a horizontal slide portion overlying the companion portion of the floor-engaging member and an auxiliary portion underlying the same, said portions of the seat-engaging member containing like corrugations in opposing vertically-spaced relation to those of the floor-engaging member to form complementary race-ways in the concave portions thereof, ball bearings arranged in said race-ways, and means for releasably latching said members against relative sliding movement.

8. A sliding seat mounting for automobiles and the like, comprising a floor-engaging member having a single-walled slide portion containing longitudinal corrugations forming in the troughs thereof oppositely-facing race-ways, a seat-engaging member having a double-walled slide portion overlying and underlying the opposing corrugated faces of said first-named slide portion and containing like corrugations to form complementary race-ways, and ball bearings arranged between and guided in said race-ways.

9. A device of the character described, comprising relatively movable slide rails having longitudinally corrugated portions disposed in superposed relation, the corrugated portion of one rail embracing the opposite faces of the companion rail portion with the troughs of one rail in opposing relation to the troughs of the companion rail to jointly form laterally offset race-ways disposed in different vertical planes, and anti-friction elements arranged in said race-ways.

10. A device of the character described, comprising relatively movable slide rails having longitudinally corrugated portions disposed in superposed relation with the troughs in opposing relation to jointly form a race-way, one of said rail portions extending around the marginal edge and below the bottom face of the other rail portion and terminating in a trough opposite to one in said other rail portion to jointly form a second race-way below and laterally offset relatively to said first-named race-way, and anti-friction elements arranged in said race-ways, respectively.

MONTAGUE P. BROWNE.